United States Patent [19]
Whittaker et al.

[11] Patent Number: 5,737,567
[45] Date of Patent: *Apr. 7, 1998

[54] FAST WRITE INITIALIZATION SYSTEM FOR MICROCODE RAM VIA DATA PATH ARRAY USING PRE-LOADED FLASH MEMORY AN PROGRAMMABLE CONTROL LOGIC ARRAY

[75] Inventors: Bruce Ernest Whittaker, Mission Viejo; James Henry Jeppesen, III, Lake Forest, both of Calif.

[73] Assignee: Unisys Corporation, Blue Bell, Pa.

[*] Notice: The term of this patent shall not extend beyond the expiration date of Pat. No. 5,706,424.

[21] Appl. No.: 546,650

[22] Filed: Oct. 23, 1995

[51] Int. Cl.[6] ............................................. G06F 13/00
[52] U.S. Cl. ..................... 395/430; 395/429; 395/481; 395/185.07; 395/308; 365/185.33
[58] Field of Search ................................ 395/429, 430, 395/481, 185.07, 308; 365/185.33

[56] References Cited

U.S. PATENT DOCUMENTS

| | | | |
|---|---|---|---|
| 5,327,531 | 7/1994 | Bealkowski et al. | 395/164 |
| 5,471,674 | 11/1995 | Stewart et al. | 395/650 |
| 5,504,905 | 4/1996 | Cleary et al. | 395/700 |
| 5,522,076 | 5/1996 | Dewa et al. | 395/652 |
| 5,537,609 | 7/1996 | Whittaker et al. | 395/800 |
| 5,574,883 | 11/1996 | Freeman | 395/446 |

*Primary Examiner*—Eddie P. Chan
*Assistant Examiner*—Hong C. Kim
*Attorney, Agent, or Firm*—Alfred W. Kozak; Mark T. Starr; Steven R. Petersen

[57] ABSTRACT

A network comprising a central processing module and maintenance subsystem which provides a system for rapid loading of instruction words in a microcode RAM whereby microcode instruction words from the maintenance subsystem are preliminarily loaded into a flash memory in the central processing module. A maintenance controller transfers the microcode instruction words from the flash memory over a transfer bus to a data path array which connects to a processor-instruction memory bus for enabling microcode addresses and data words to be rapidly transferred into a microcode RAM instruction memory. A programmable controller activated by the maintenance controller in the central processing module then regulates the transfer of data to the microcode RAM by providing incrementation of the addresses of the instruction words on an automatic basis and thus relieving the processor of this function. Due to the pre-loading of the microcode instruction words into flash memory of the central processing module, there is provided a rapid loading of the microcode RAM during initialization routines without the need to burden the processor or the maintenance subsystem.

6 Claims, 6 Drawing Sheets

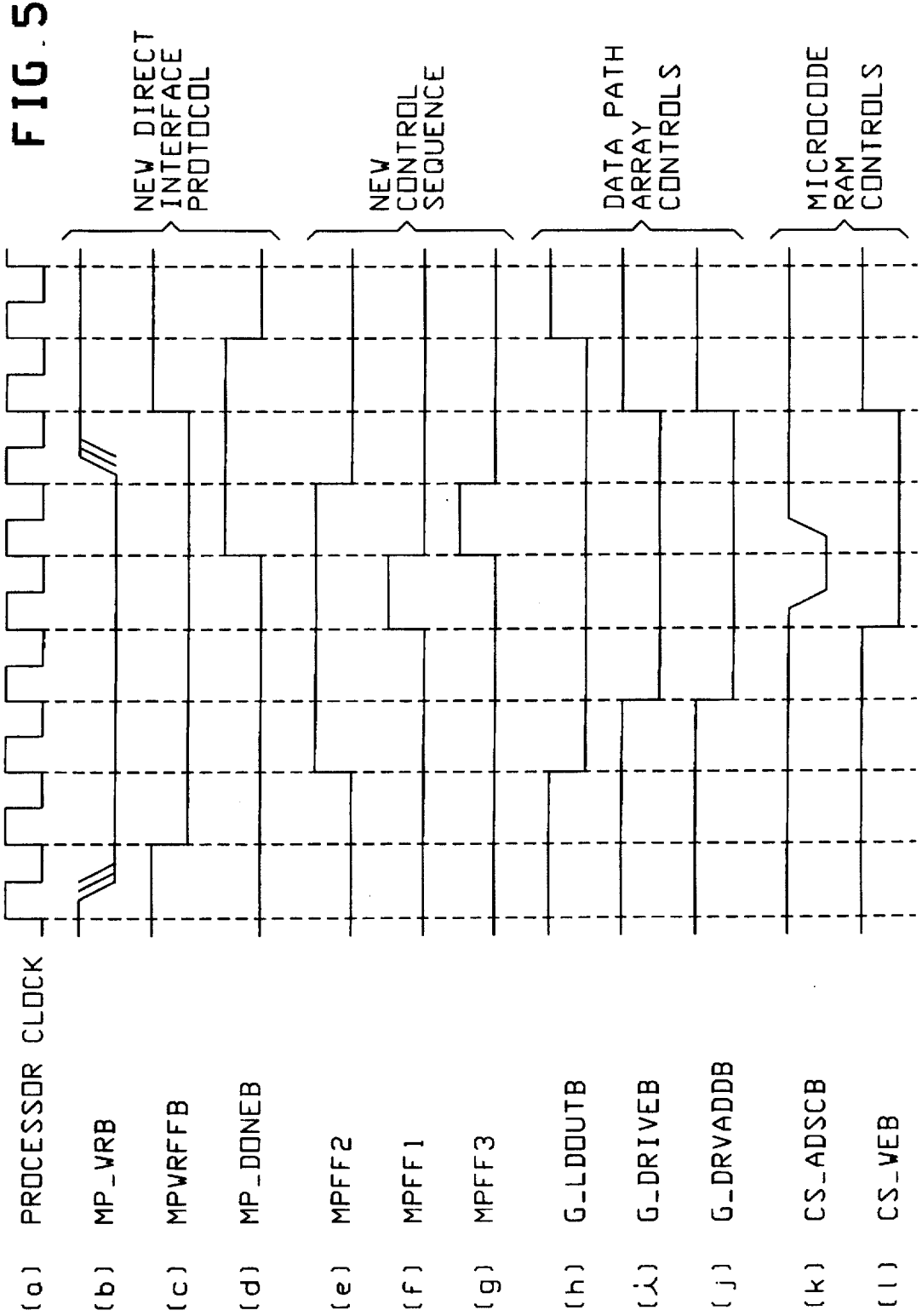

FAST WRITE INITIALIZATION SYSTEM FOR MICROCODE RAM VIA DATA PATH ARRAY USING PRE-LOADED FLASH MEMORY AN PROGRAMMABLE CONTROL LOGIC ARRAY

REFERENCES TO RELATED APPLICATIONS

This application is related to a application, U.S. Ser. No. 08/546,651, filed Oct. 23, 1995, and entitled "System for Fast Read and Verification of Microcode RAM."

FIELD OF THE INVENTION

This disclosure relates to systems and methods for the rapid loading of microcode in RAM memory of a computer system.

BACKGROUND OF THE INVENTION

FIG. 3A is a diagram illustrating a computing system having the basic elements of a central processing module 10, a main system memory module 40 and one or more input/output modules 50. These modules operate by interconnecting via a dual system bus structure such as system bus A, $22_a$ and system bus B, $22_b$. These involve two identical and interchangeable system busses providing a dual system bus structure.

FIG. 3B indicates an enhancement to the system of FIG. 3A by adding the maintenance subsystem module 60. The maintenance subsystem module provides both diagnostic functions to all system modules and is also required to initialize all system modules and to "start-up" the system for subsequent operation. The maintenance subsystem module 60 is seen connecting to all of the system modules via the dashed line connections, 64a, 64b and 64c. These lines are seen connected to the central processor module 10, the input/output modules 50, and the main system memory module 40. These dashed line connections represent the standard maintenance connections of a system designated as the JTAG system which is specified in IEEE 1149.1, and used for diagnostic and maintenance purposes.

The IEEE 1149.1 Standard represents an industry standardized interface which provides a bit serial data transfer between the various target modules and the maintenance subsystem 60. Through this bit serial interface, all the system modules are set-up (initialized) for system operation. This interface is a system compromise between cost and performance. It is inexpensive in cost since it is standard and only a few wires are required since it is a bit serial data transfer. However, the bit serial aspect always makes the operations very slow if massive amounts of information must be transferred. Normally, system initialization does not require an overburdened amount of data transfer to most modules. However, the situation often presented in this environment, is one where significant time is lost if only the standard JTAG interface system is used for initialization of the central processing module 10 (CPM). Thus, it is a desirable condition and, as provided for in the present disclosure, for establishing a situation which calls for, not only the use of the JTAG connections, but a efficient way by which the maintenance subsystem 60 can utilize the high speed and wide normal bus structures of system busses 22a and 22b.

There are several inefficient conditions which occur in loading microcode, for example, from a disk or tape to a RAM memory. One inefficiency in loading microcode in this situation would be the enabling use of a source, for example, of 348K bits of microcode data as may be illustrated from FIG. 2.

The "source" of microcode in FIG. 2 may be the cartridge tape 61 or one of the disks 62, 63 that connect directly to the maintenance processor 64. Unless a new release of microcode was being loaded, the "source" would logically be the hard disk peripheral 62. However, every byte of the microcode data would have to be transferred over the serial interface 60si between the maintenance subsystem 60 and the central processing module 10.

The protocol on this serial interface 60si is not such as to allow "bursts" of data but rather requires several actions of protocol for each byte of data transferred. For ordinary diagnostic operations, this rather inefficient serial method is sufficiently useful. However, since the microcode is very large, it must be loaded every single time the system is initialized. The overhead of the serial interface 60si and the slowness of reading the disk 62 is very significant and also inefficient in its time consuming transfer which unfortunately strings out the initialization period.

Another inefficiency occurring in the prior art, is where the standard JTAG interface is used on the central processing module 10 to connect all of the on-card components of the maintenance controller 12 of FIG. 2. Again, using standard diagnostics for the central processing module 10, this interface 60si is normally sufficient and cost effective. However, for "loading" of the microcode RAM memory 18 with several hundred thousand microcode words, the inefficiencies of the serial interface 60si are quite inadequate and not tolerable time wise.

Using only the JTAG serial connections 12p, 12c, 12d, it is possible to Write into the microcode RAMs 18. The procedure would require a number of separate items to be shifted by the maintenance subsystem 60. It may be noted that the RAM devices 18 are not JTAG devices, and therefore there is no direct JTAG path into them which exists. Thus, the required steps of this inefficient prior art system may be summarized as follows:

PRIORLY USED LOOP a) The maintenance subsystem 60 shifts the RAM address value into the Data Path Gate Array 20. This can later be a source of addresses to the microcode RAMs 18.

b) The maintenance subsystem 60 shifts the first half of each one of a 90-bit microcode word into the Data Path Gate Array 20. This can then provide for and be the source of data to the microcode RAMs, 18 FIG. 2.

c) The maintenance subsystem 60, via interface 60si, Controller 12, and line 12c, shifts into the control programmable array logic (PALs) 16 the appropriate control state to cause the "Write Enable" strobe signal to occur for RAM 18.

d) Then, steps (b) and (c) are repeated for the second half of the 90-bit microcode word.

e) Then, the steps a, b, c, and d are repeated for each one of the 32K microcode words.

As can be seen, the above steps entail many bit serial shifts of some very long shift chains (possibly 2000 flip-flops may be involved). The above-shown initialization procedure which is controlled by the maintenance software running in the maintenance processor 64, will indeed Write to the microcode RAMs 18 but will take a very long time, maybe several minutes or more.

With reference to FIG. 2, there is seen an earlier architecture for the central processing module 10 interconnected with the maintenance subsystem 60 via a serial interface bus 60si. The maintenance subsystem 60 may have a tape unit 61 for holding data, a hard disk 62 for holding data and a floppy disk 63 also holding data wherein each of these data reservoirs are fed to the maintenance processor 64 for conveyance on the serial interface 60si over to the maintenance controller 12 of the central processing module 10. The dashed lines in FIG. 2 show the serial JTAG connections used for maintenance and diagnostics of the processor 14, PAL Controller 16 and Data Path Gate Array 20 which have boundary scan circuits for JTAG operations.

In the central processing module 10, the maintenance controller 12 is seen to have serial JTAG connections 12p to the processor 14; to the programmable array logic PAL Controller 16 via line 12c and to the Data Path Gate Array 20 via line 12d.

Thus, FIG. 2 now indicates some of the internal circuitry units of the central processing module 10 and also some of the peripheral mechanisms of the maintenance subsystem 60.

Within the maintenance subsystem 60, the cartridge tape 61, the hard disk 62 and the floppy disk 63 are peripheral units which are controlled by the programably maintenance processor 64. These devices in the maintenance subsystem can provide a large data base of information that may be necessary to initialize and set up the processing system network for operation.

Also seen in FIG. 2 are several major circuitry blocks of the processor logic in the central processing module 10. These include the processor 14, also called a "processing element" (PE), the Data Path Array 20, the programmable array logic (PAL) controller 16 called the "PAL Controller 16" and the microcode RAM internal memory 18.

In this architecture, the processor 14 can access the major system modules 40, 50 shown in FIG. 2 via the dual system busses 22a and 22b by means of the on-card Data Path Array 20. The Data Path Array 20 converts timing rates from the on-card high speed processor bus 14b to the slower inter-module system busses 22a and 22b.

Software controls and flexible programmable array logic for the PAL controller 16 is used to provide control of the processor bus 14b and the system busses 22a and 22b and also the Data Path Array 20 functions. The on-card versions of the serial JTAG Connections are shown as the dashed lines indicated in FIG. 2 as 12b, 12c, and 12d. However, once processor initialization has been completed, these dashed lines for the JTAG connections, are no longer essential for use of the system. MICROCODE RAM 18: FIG. 2 shows the microcode RAM 18 attached to the processor high speed bus 14b. In regard to the microcode usage by the system, it should be indicated that the "higher order" instructions that operate within the processor 14, are built using "soft" microcoded routines. These microcode routines operate at the lowest level of processor hardware by manipulating data, busses, registers, operational functions, etc. within the processor in order to achieve the higher order functions.

These microcode routines get their operational sequential instructions from microcode words which are stored in the microcode RAM 18. These words are available to the processor hardware via the processor bus $14_b$ from the microcode RAM 18. The microcode RAM module 18 is a very fast static RAM device (or plurality of devices). The microcode words are adaptable to the Unisys Computer System designated as the A11/1011/1211 systems where the microcode words are 90 bits wide and stored in RAM 18 which is 32K words deep.

The power of having "soft" microcode routines is that the somewhat "standardized" processor hardware can be used to implement numerous and very high level system instructions. Thus, the "real processor" is not, therefore, designed in hardware, but rather in the "soft" microcode routines that implement all the unique system operations.

This flexibility comes at the cost of having to load up and "Write" the microcode RAMs 18 each time the processor is initialized. It may also be noted that the use of so-called "non-volatile" RAM devices, would be much more expensive and could not provide the speed required in this system. Thus, the value and importance, as indicated in this system, involves the loading up or Writing in, of the microcode RAMs in an efficient and flexible manner.

As was earlier indicated in regard to prior art techniques, if the logic were implemented only as depicted in the architecture of FIG. 2, the necessary Writing into the microcode RAMs of the micro code routines could certainly be accomplished but however, there would be a significant delay, even to the extent of several minutes, each time this system was initialized. Thus, without the method and system provided this disclosure, it was seen that there were at least two levels of inefficiency which would occur in loading-up (Writing into) the microcode RAM 18.

As previously discussed, one of the earlier problems in loading microcode would be the problem, for example, of loading 384 kilobytes of microcode data which might be loaded from the cartridge tape 61, or the disks 62 and 63 that connect directly to the maintenance processor 64. Thus, every byte of the microcode data would have to be transferred over the serial interface 60si from the maintenance subsystem 60 to the CPM module 10. The problem with this type of serial interface is that it involves a protocol which does not allow bursts of data but requires several time-consuming actions of protocol for each and every single byte of data transferred.

Thus, for diagnostic purposes, this inefficient serial method could be considered allowable but since the microcode involves a large volume of data which must be loaded every time the system is initialized, the "overhead" of the serial interface and the slowness of Reading the disk is very inefficient, time consuming and not tolerable.

Another inefficiency of the earlier system shown in FIG. 2 is that of the standard JTAG interface used on the CPM module 10 to connect all the on-card components to the maintenance controller 12. These involve the connecting lines 12b, 12c and 12d, FIG. 2. For standard diagnostics of the central processing module 10, this JTAG interface of FIG. 2 is normally sufficient. However for loading of the microcode RAM 18 with microcode data, it is a very inefficient procedure. This inefficient procedure would require a number of separate items to be shifted by the maintenance subsystem 60 as indicated in the steps cited as (a), (b), (c), (d) and (e) in the "Background of the Invention."

The present system and method as indicated in FIG. 1 relieves the inefficiencies discussed above. The present system provides a speedier and more efficient way of sourcing the large microcode data base and secondly, it greatly enhances the actual Write loop for the microcode RAM memory 18.

The presently-described new method and system shown hereinafter will be seen to greatly improve the microcode loading initialization procedure in a minimal time frame with virtually no additional hardware costs and with great savings in time involvement.

SUMMARY OF THE INVENTION

In order to relieve the slow, laborious and time-consuming process, during initialization, of loading the microcode RAM memory of a computer system which is normally done through a slow serial interface, the present disclosure involves a system by which a maintenance controller and PAL controller provide a specialized interface to a data path array enabling rapid writing and loading of the microcode RAM.

The maintenance controller is enhanced with a flash memory device which holds a large number of microcode words which have been previously received (pre-loaded) from a maintenance processor. These words are then passed through the maintenance controller over to a data path array over a specialized wide bus which loads an address register and a data register in the data path array.

The PAL controller then activates the address and data registers in the data path array on to a high speed processor bus into the microcode RAM for rapid addressing and loading of data in the microcode RAM.

As a result while ordinary initialization could take several minutes, the present system and method enables the loading of the microcode RAM within a few seconds.

BRIEF DESCRIPTION OF THE DRAWINGS

FIG. 5 indicates a timing diagram of the protocol, the control sequence flip-flops, the data path control and microcode RAM control signals involved in Writing to load the microcode RAM.

DESCRIPTION OF PREFERRED EMBODIMENT

Figure 1:
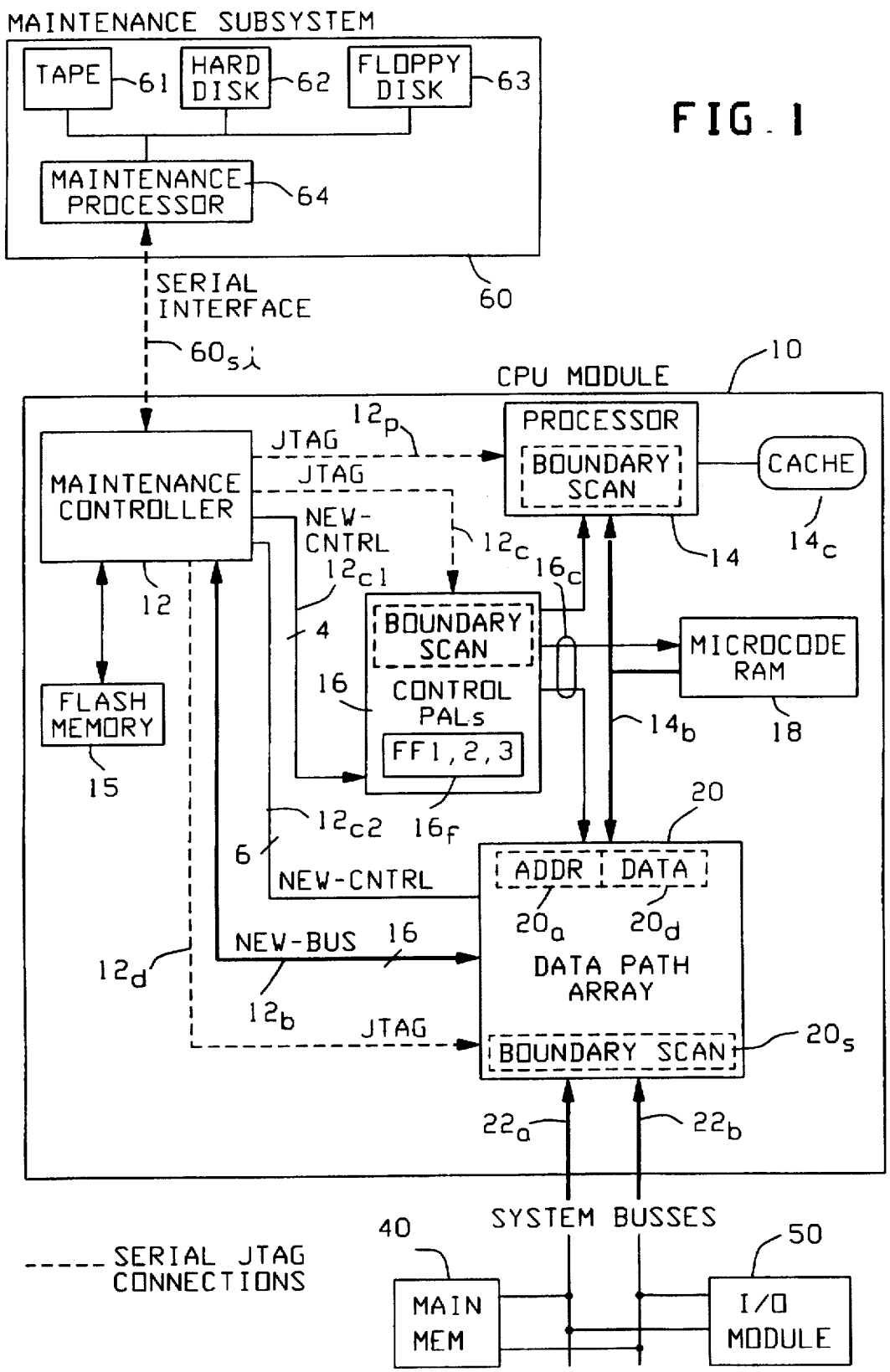
FIG. 1 is a drawing of the present initialization system for enabling efficient and rapid loading of the microcode RAMs of a digital computer system.
Figure 2:
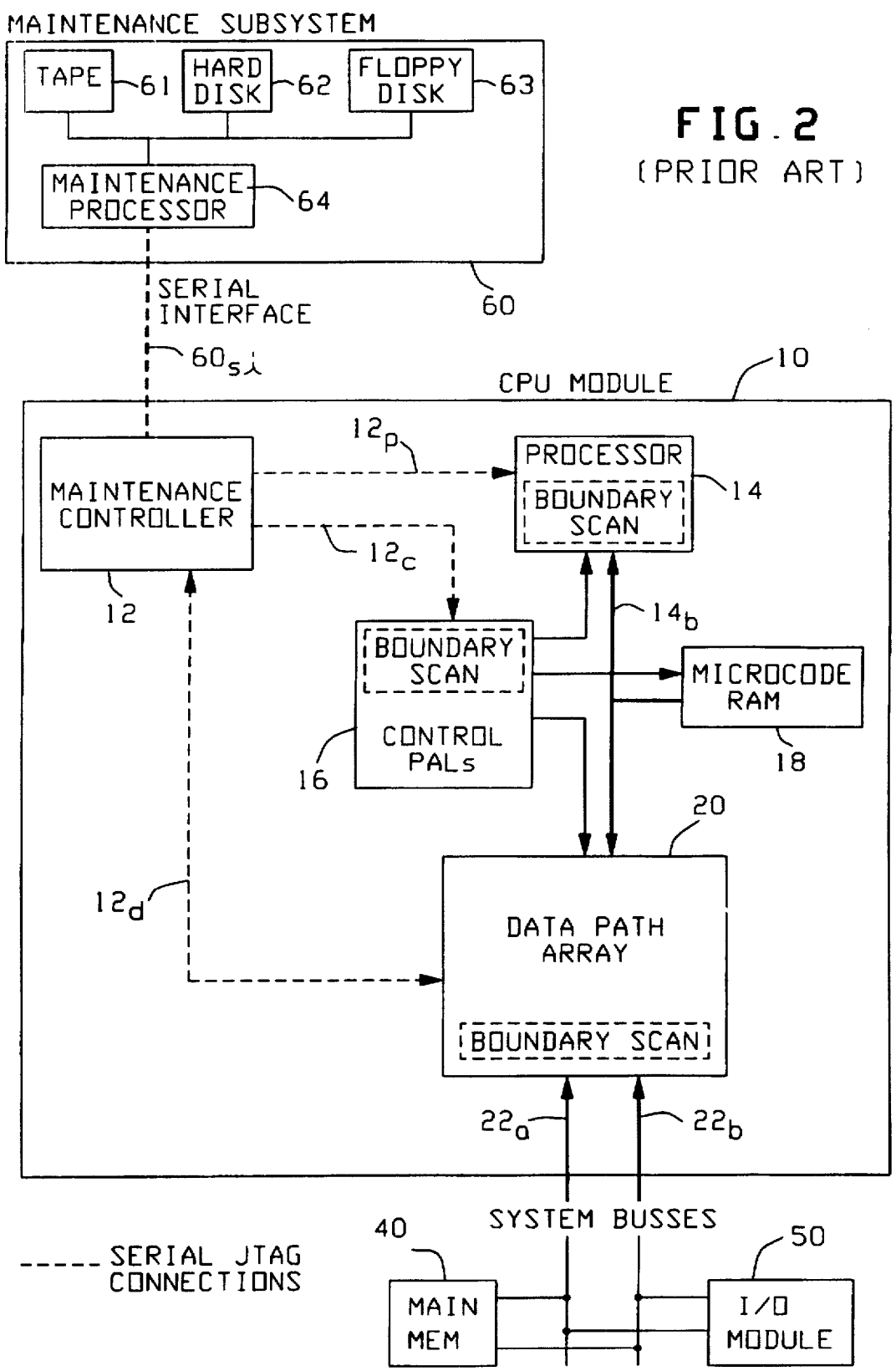
FIG. 2 is a drawing illustrating an earlier method for loading data into the microcode RAM of a central processing module.
Figure 3A:
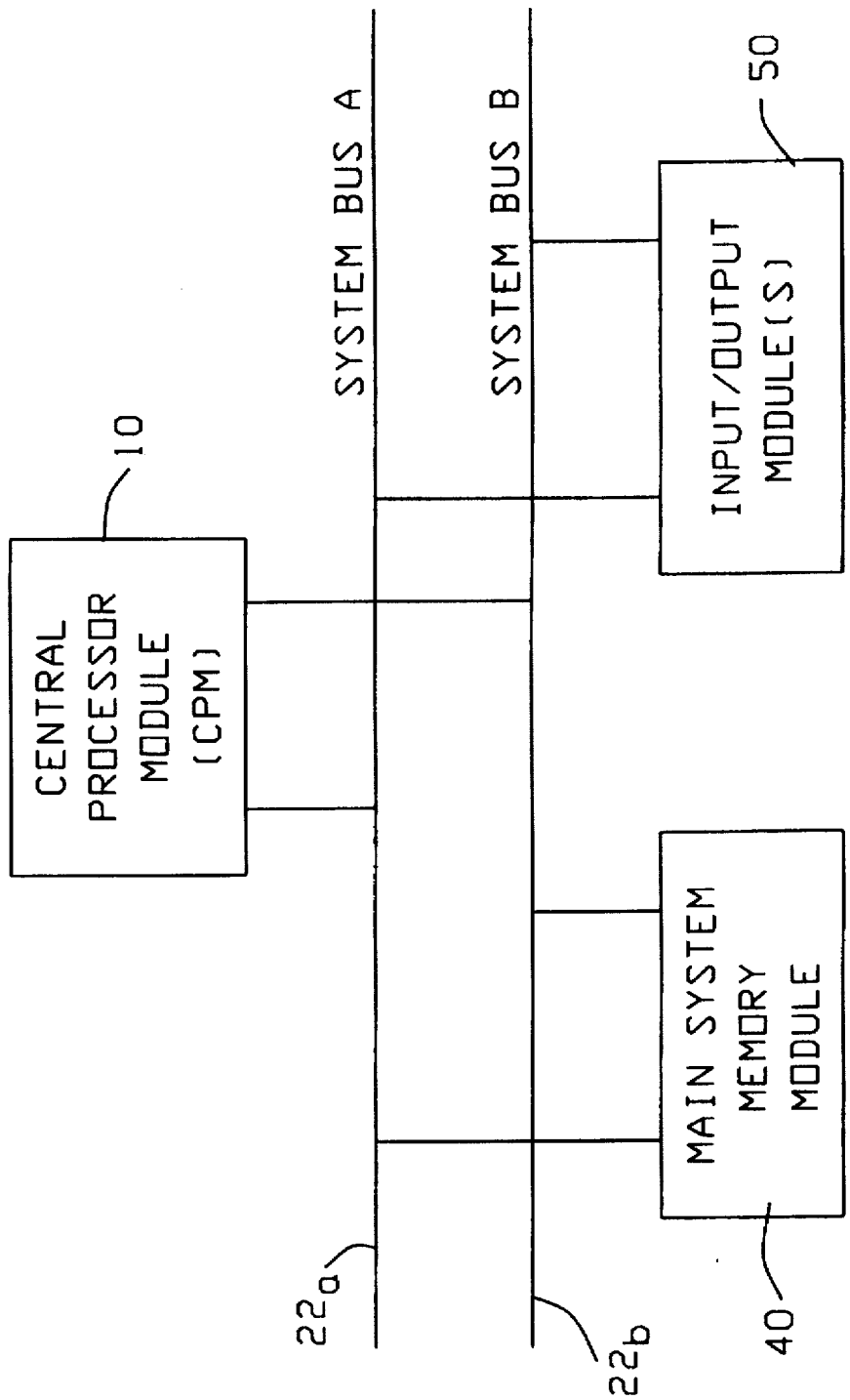
FIG. 3A is a generalized block diagram of a special digital network using dual busses for intercommunication between digital modules.
Figure 3B:
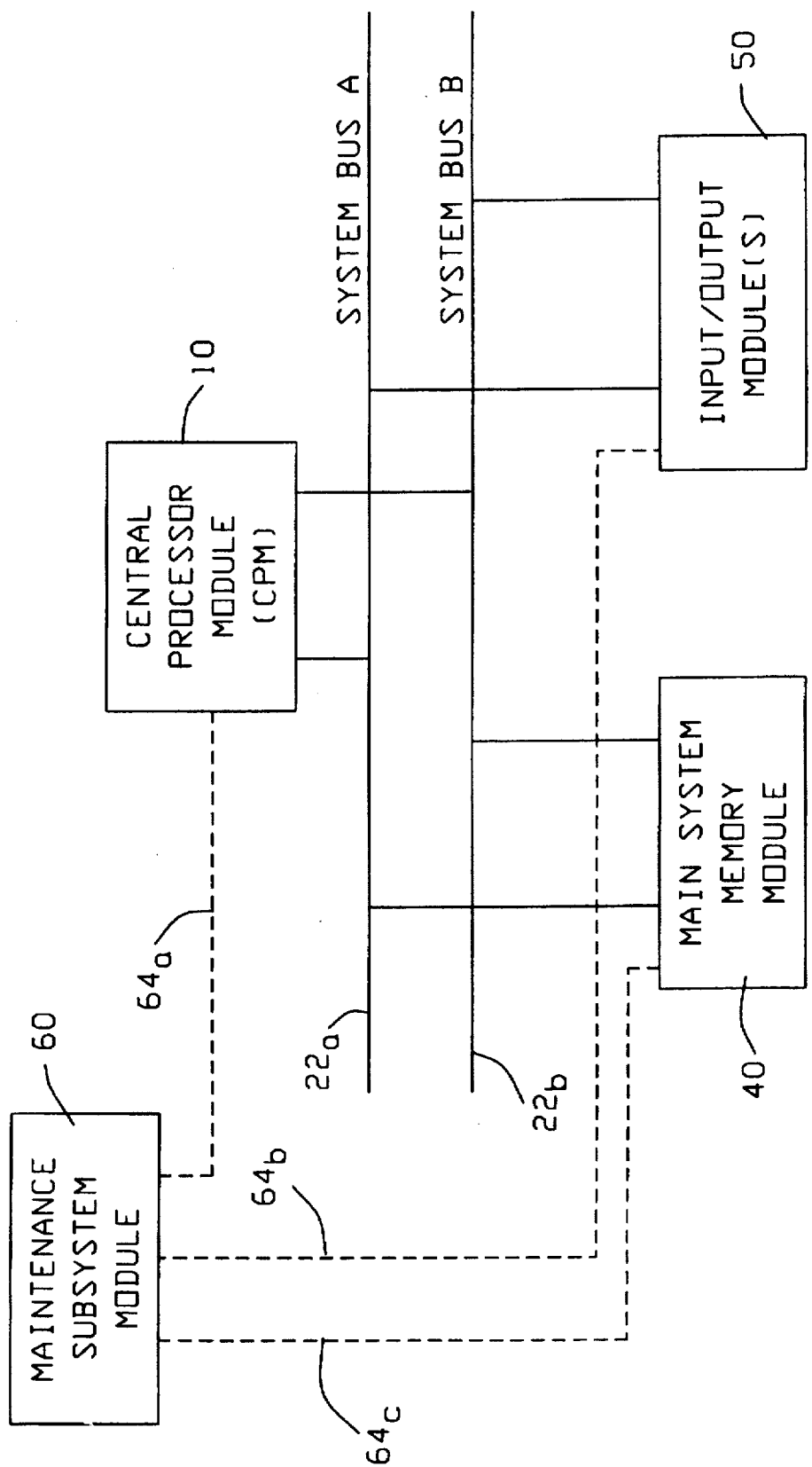
FIG. 3B is a block diagram of a dual bus digital system being monitored by a maintenance subsystem module.

The present initialization system and fast write method is illustrated in FIG. 1 which shows a number of enhancements which were not present in the earlier technology of FIG. 2.

As seen in FIG. 1, the maintenance controller 12 is connected to a flash memory RAM storage unit 15 within the central processing module 10. The flash memory RAM 15 is non-volatile, but also can be modified by the maintenance subsystem 60. The flash memory 15 can provide a large on-card data storage facility for the maintenance controller 12.

Under normal operating situations, on system initialization, the microcode RAM 18 will be loaded from the data base stored within the flash memory RAM 15. This path is very fast, especially when compared to the serial path 60si from the maintenance processor 64. Only when new microcodes are added to the system, does the data base come across the serial interface from the tape cartridge 61 or the hard disk 62. Then, the flash memory RAM 15 will be written with the new data base information of the newly added microcode words.

ENHANCED MICROCODE RAM WRITE LOOP: In FIG. 1, there is seen two new "direct" controls 12c1, 12c2 and a new "direct" bus 12b from the maintenance controller 12 to provide for a much improved microcode RAM Write loop. These new controls, as shown in FIG. 1, are conveyed by lines 12c1 and 12c2. The enhanced loop involves the functions of (i) Load Address, (ii) Write Data, (iii) Increment Address, and (iv) Write Data. This is done on a repetitive basis until all microcode words are placed in RAM 18. The "enhanced" loop allows the maintenance controller 12 to utilize the normal, fast, wide parallel paths over to the microcode RAM 18 rather than using the slow, serial line JTAG paths $12_c$, $12_d$ and $12_p$. Thus, the new bus 12b shown in FIG. 1 connects the maintenance controller 12 through the data path 20 over to the microcode RAM 18. The new "direct" lines allow the Maintenance Controller 12 to emulate the actions a normal processor 14 would take with regard to loading the microcode RAM 18. The Maintenance Controller 12 utilizes the same functional logic and data paths as the processor 14, and the Control Logic in the Control PAL 16 functions the same for the Maintenance Controller 12 as for the processor 14.

DATA PATH ARRAY (NEW MODE): Referring to FIG. 1, the Data Path Array 20, since it connects to the processor bus 14b on which the microcode RAM 18 resides, has a path to the address and the data register $20_a$ and $20_s$ for the microcode RAM 18. With the prior art, for each word written into the RAM 18, the values for the address and the data had to be shifted serially via the JTAG path 12d into the high speed boundary scan register $20_s$ of the Data Path Gate Array 20. In this fashion, the data path array could source these values from the boundary scan registers over to the RAM for Writing in.

In the present enhanced version shown in FIG. 1, an additional parallel path via bus $12_b$ into the Data Path Gate Array 20 from the maintenance controller 12 is provided. The new "direct" connection includes five control signals and a 16-bit bus designated 12b. Using the 16-bit direct bus 12b, allows the necessary wider fields (address equal to 32 bits; microcode word equal to 90 bits) to be much more quickly built up in the Data Path Gate Array 20 than could have been done via the serial JTAG shifting method. The signals involved in the new "direct" interface are shown below in TABLE I which indicate control signals from Maintenance Controller 12.

TABLE I

| CONTROL SIGNALS FROM MAINTENANCE CONTROLLER 12 (Line 12c2 of FIG. 1) | |
|---|---|
| MP_LADDB | Signal from the Maintenance Controller 12 causing the current value on the MP_DATA bus 12b to be loaded into the selected portion of the Data Path Array address register 20a. (FIG. 1) |
| MP_STRDATLB | Signal from the Maintenance Controller 12 causing the current value on the MP_DATA bus 12b to be loaded into the selected lower portion of the Data Path Array data register 20d. (FIG. 1) |
| MP_STRDATUB | Signal from the Maintenance Controller 12 causing the current value on the MP_DATA bus 12b to be loaded into the selected upper portion of the Data Path Array data register, 20d. |
| MP_REGSEL (1:0) | Two signals from the Maintenance Controller used to select which half of the address register 20a is to be loaded or which half of the upper/lower portion of the data register 20d in the Data Path Array is to be loaded. |
| MP_ADDINCB | Signal from the Maintenance Controller 12 causing the value in the Data Path Array address register 20a to be incremented by one. |

Note: Signals ending in "B" are active low.

Thus, the direct interface, while very minimal as to hardware impact, is significant with respect to enhancing the Write microcode RAM loop. The address value need only be issued once by the maintenance subsystem 60 and thereafter can be easily and quickly incremented to the next address value by means of the Maintenance Controller 12 via the signal in Table I designated MP_ADDINCB.

Also, the data values to be written in as microcode values, can be issued by the maintenance subsystem 60 in a fraction of the time and effort. Significantly also, the time for the maintenance software and the maintenance processor 60 to calculate the new address each time, is saved. Once the address and data are in the Data Path Array registers 20a and 20d, all that is necessary is for the Maintenance Controller 12 to emulate the processor paths to the microcode RAM 18 so that the necessary high speed control signals can be activated as they would be for normal processor operations. This is done in the following manner by use of the program array logic in PAL Controller 16.

PAL CONTROLLER 16 (NEW MODE): The programmable array logic (PAL) controller 16 provides the master logic which decodes the processor commands and controls the steering of all data into and out of the Data Path Gate Array 20. The controller PAL 16 also provides all the control and timing required to Write or Read the microcode RAM 18. All bus traffic on the processor bus 14b is directed by signals from the PAL Controller 16.

The PAL Controller 16 will control all actions at the full clock speed of the processor. Therefore, all the necessary controls are already in place to Write data into the microcode RAM 18. The PAL Controller already has signals necessary to steer the address value and the data value in the Data Path Gate Array 20 onto the processor bus 14b. Signals already exist (line 16c) to cause the Write strobe to the microcode RAM 18. The PAL Controller 16 can do all its functions at full processor speed rather than some slow, serial type of speed as was often done in earlier technology. The pertinent normally used control signals from the PAL Controller (programmable array logic) 16 are shown below in Table II.

TABLE II

| CONTROL SIGNALS FROM PAL CONTROLLER 16 (Lines 16c, FIG. 1) | |
|---|---|
| G_DRVADDB | Signal to Data Path Array 20 to enable driving address values out onto the processor address bus. |
| G_DRIVEB | Signal to Data Path Array to enable driving data values out onto the processor data bus, 14b. |
| G_LDOUTb | Signal to Data Path Array to load outbound data values into the output staging register. (20d) |
| G_MSEL (3:0) | Signals to Data Path Array which steer the appropriate data paths out of the array to the processor data bus. (14b) |
| CS_ADSCB | Signal to the Microcode RAM 18 causing the current address value on the processor address bus to be strobed into the Ram. |
| CS_WEB | Signal to the Microcode RAM 18 causing the current data value on the processor data bus to be written into the RAM at the address strobed in previously. |

Signals ending with "B" are active low.

Each of the signals shown in TABLE II were previously used in the PAL Controller 16, but what the present system and method disclosed herein does, is to add a simple direct way by which the maintenance controller 12 can cause the sequences that normally control these signals to be executed. In effect, the new direct controls from the maintenance controller 12 operate to "logically-OR" into the existing control logic for these signals.

The logic equations (sometimes shown as partial equations) for the control signals of the PAL Controller 16 are shown below in TABLE III. The newly added maintenance controller terms are denoted therein. TABLE III is given to show the new "OR" logic that is used. The normal logic portion of the equations are not described. From these equations, it can be seen that minimal amounts of new logic had to be added to the existing control terms in order to provide a fast Write path for the microcode RAM 18.

TABLE III

| LOGIC EQUATIONS FOR CONTROL SIGNALS FROM PAL CONTROLLER 16 | |
|---|---|
| LOGIC EQUATION | DESCRIPTION |
| G_DRVADDB := | normal logic |
| RDLRU*RDMISSFF*RDCMPLT*READ4 | maintenance controller |
| + MPFF2 | term |
| G_DRIVEB := | normal logic |
| BIUFF+MEMFF2*RDMISSFF | maintenance controller |
| + ... | term |
| + MPFF2*MPWRBFFB | |
| G_LDOUTB := | normal logic |
| BIUOPF+READ_ELOG | maintenance controller |
| + ... | term |
| + MPWRBFFB/ | |
| G_MSELn := | normal logic |
| ... | maintenance controller |
| + MPWRBFFB/*MP_MEMOP/ | term |
| CS_ADSCB = | normal logic |
| MEM_OP_1*READ2*MEMFF1X/ | maintenance controller |
| + MPFF1*MPTEST0 | term |
| CS_WEB := | no normal logic terms |
| MPFF1*MPWRBFFB/*MPTEST0 | maintenance controller |
| | term |

Notes:
:= means to set a D-Flip-flop
= means a gate (combinatorial) term
+ means logical-OR
* means logical-AND
/ means logical-NOT
... means more normal logic not shown

GLOSSARY FOR TABLE III

BIUFF: This is a signal for decoding certain non-memory processor OPs and is implemented by the Control PAL 16.

BIUOPF: This is a signal for decoding certain non-memory processor operators in Control PAL 16.

CS_ADSCB: This is a signal from the Control PAL 16 to the microcode RAM 18 which causes the address on the bus $16_c$ to be captured.

CS_WEB: This is a signal from the Control PAL 16 to the microcode RAM 18 to deliver a Write-Enable signal.

GDRVADDB: This signal causes the data path gate array 20 to drive addresses onto the processor bus $14_b$. It is originated from the Control PAL 16.

G_DRIVEB: This is a signal from the Control PAL 16 to the data path gate array 20 in order to drive data onto the processor bus $14_b$.

G_LDOUTB: This signal from the Control PAL 16 to the data path array 20 causes the output register $20_d$ to be loaded.

G_MSLn: This is a signal from the Control PAL 16 into the data path gate array 20 in order to control a multiplexer therein.

MEMFF: This is a signal generated by the Control PAL 16 to decode the memory operators (OPs).

MPTEST0: This is a signal generated by the Control PAL 16 in order to establish maintenance testing.

MEMFF1X/: This is a control flip-flop which serves the purpose of enabling the setup of the Read 2 command.

MEM_OP1: This is a signal generated by the Control PAL 16 for decoding memory-type operators (OPs).

MPFF1: These are 3 flip-flops in the Control PAL 16
MPFF2: which set the state conditions in the sequence
MPFF3: diagram of FIG. 4.

MPWRBFFB: This is a signal from the maintenance controller 12 to the Control PAL 16 to start writing the microcode RAM 18. This is a flip-flop which synchronizes the clock.

MP_MEMOP/: This signal from the maintenance controller 12 to the Control PAL 16 indicates the operation for Writing/Reading the microcode RAM 18 or to Write/Read main memory.

READ_ELOG: This signal is generated by the maintenance controller 12 or by the Control PAL 16 in order to decode a specific command instructing the system to Read the Error Log Unit in the Data Path Array 20.

READ 2: This is a signal by the Control PAL 16 for a two-word Read. This enables the system to Read the microcode command and decode it.

READ 4: This is a signal from the Control PAL 16 to do a four-word Read, wherein the cache unit 14c is enabled. This Read 4 signal goes to and from the Control PAL 16.

RDCOMPLT: This signal generated from the Control PAL 16 back to the Control PAL 16 indicates that the system bus operations are complete.

RDLRU: This is a signal going to and from the Control PAL 16 in order to decode the indication that a Read OP is active.

RDMISSFF: This is a signal to and from the Control PAL 16 which indicates a Read Miss (in the cache) during the operation.

In addition to the new "OR" terms seen in TABLE III, a new sequence to handle the protocol for the direct control from the maintenance controller 12 is added to the PAL Controller 16. This is indicated hereunder with the description of "Direct Protocol".

DIRECT PROTOCOL (NEW MODE)

In order to provide the ability to emulate the usage of the high speed wide bus structure by the maintenance controller 12, a four signal, direct interface is made between the maintenance controller 12 and the PAL Controller 16. The PAL Controller 16 operates at the maximum clock rate, which is to say, equal to that of the processor 14, while the maintenance controller 12 operates at a much slower clock rate. Thus, the new direct interface must provide for this asynchronous condition. This is done by using a handshaking arrangement.

Of the four signals in the direct interface, only two of these signals are used for writing the microcode RAM 18. The signals used in the direct interface are shown hereinbelow in TABLE IV.

TABLE IV

SIGNALS FOR WRITING THE MICROCODE RAM 18
(Re 4 Lines, 12c1, FIG. 1 Between
Maintenance Controller 12 and Control PAL 16)

| | |
|---|---|
| MP_WRB | Write control signal from the Maintenance Controller 12 indicating that the PAL Controller 16 should execute a Microcode RAM write operation. |
| MP_DONEB | Return handshake signal from the PAL Controller 16 indicating that the current operation is now complete. |
| MP_RDB | (not used here) |
| MP_MEMOP | (not used here) |

B=Active Low Signals

The incoming signal to PAL Controller 16 MP_WRB is captured (synchronized to the processor clock rate) in a flip-flop called MPWRBAFFB in the PAL Controller 16. The flip-flop is then used in the control sequence.

Three flip-flops 16f1, 16f2, 16f3, internal to the PAL Controller 16, FIG. 1, are used to control the sequence of the protocol and the fast bus controls. These flip-flops are designated: MPFF1, MPFF2, MPFF3, in Table III and in FIGS. 4 and 5.

Figure 4:
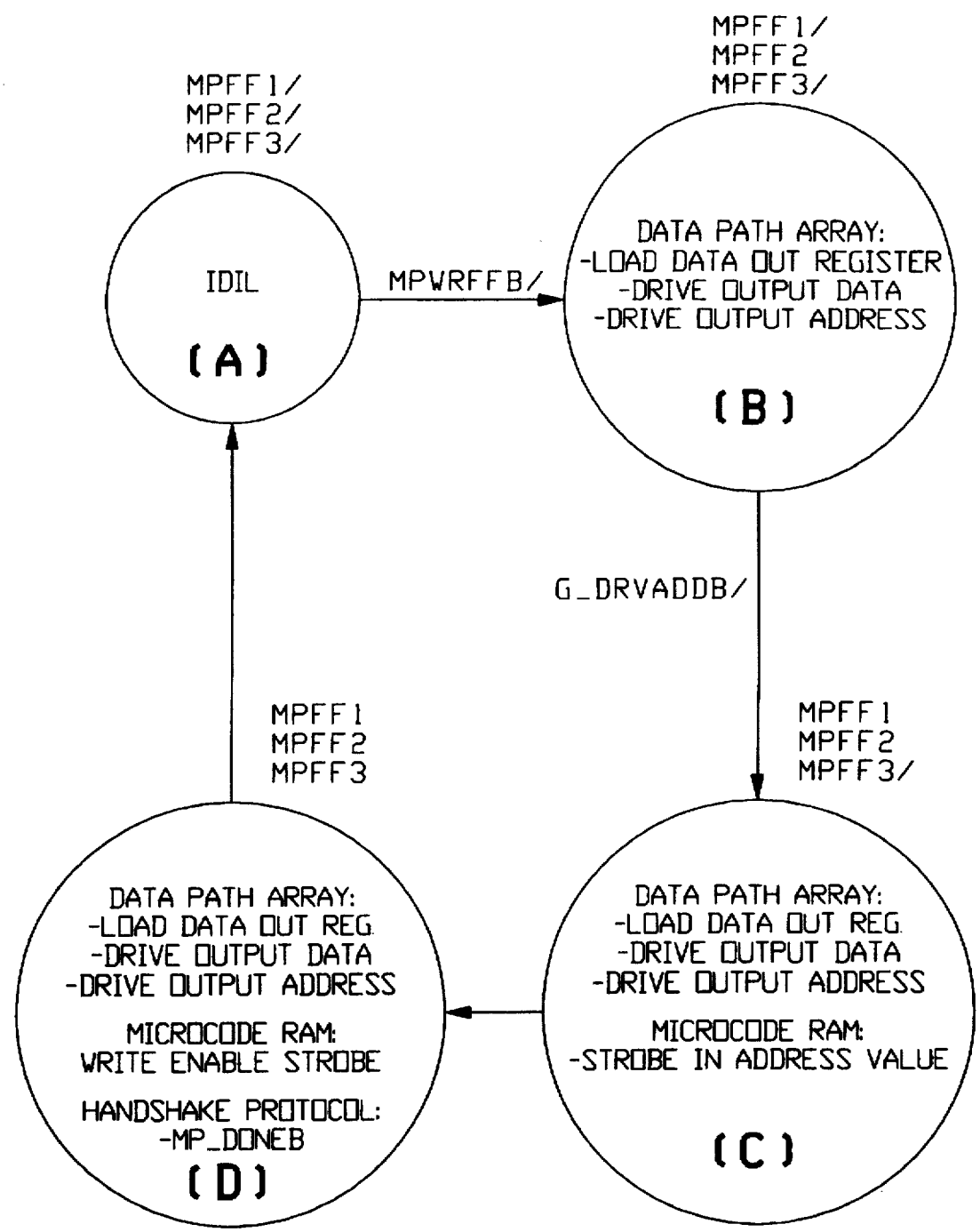
FIG. 4 is a diagram illustrating a sequential method of the emulating the usage of a high speed bus structure by a maintenance controller using a four-signal direct interface between the maintenance controller and a data path controller (PAL)

FIG. 4 shows the sequence of operation of the PAL Controller 16 while FIG. 5 shows the timing of the protocol, the sequence flip-flops, and the various normal control signals involved in writing into the microcode RAM 18.

Referring to FIG. 4 and starting from the Idle condition (A), the Write flip-flops (in control PAL 16) will communicate to the Data Path Gate Array 20 in order to load the data-out register 20d, (FIG. 1) to drive output data and to drive the output address (B). The Data Path Array 20 will then load the data out register, 20d, drive the output data, and drive the output address (C, FIG. 4) at which time the microcode RAM 18 will strobe in the address values at (D) of FIG. 4.

Subsequently in the sequence shown in FIG. 4, the Data Path Array 20 will load the data out register, will drive the output data and drive the output address so that the microcode RAM 18, using its Write enable strobe (D) can then Write the data into the microcode RAM, using a hand-shake protocol. When this is completed, the system will return to the Idle condition (A).

FIG. 5 indicates the timing of the protocol, the sequence of flip-flops and the various normal control signals involved in writing into the microcode RAM 18. As seen in FIG. 5, line (a) shows the processor clock signals. Line (b) shows the maintenance processor 64 (FIG. 1) developing the Write command. Line (c) shows the operation of the Write flip-flop in the PAL Controller 16.

Line (d) of FIG. 5 shows the completion or "done" signal from the maintenance controller 12. These signals on lines (b), (c) and (d), constitute the new direct interface protocol.

The new control sequences are shown in lines (e), (f) and (g). The flip-flops in the PAL Controller 16 are indicated as operating on line (e) where the second flip-flop activates, in line (f) where the first flip-flop activates, and in line (g) where the third flip-flop activates.

The Data Path Array controls are shown in lines (h), (i) and (j). Line (h) shows the loading of data into the Data Path Array 20, while line (i) shows the enabling signal for the loading of this data. Line (j) shows the enabling signal for driving the address into the Data Path Gate Array 20.

Lines (k) and (l) are the control lines for controlling the microcode RAM 18. Thus, line (k) shows the enabling line for the signal CS_ADSCB shown in TABLE III, while the signal CS_WEB enabling line is shown in line (l) which corresponds to the corresponding signal shown at the bottom of TABLE III.

The new system and method for a fast emulation path is implemented with very little additional hardware cost. The new bus 12b and the new controls 12c1 and 12c2 into the Data Path Gate Array 20 only take up 22 additional array connection pins. However, if these pins are available at all, which they are in most cases, then the change to the programmable array logic is free of cost. The extra silicon usage internally to the programmable array logic is there for the taking.

In the case of the new direct interface protocol sequence, and the extra "OR" terms, all are built in the PAL Controller 16, which is completely implemented using the spare capacity within existing programmable array logic and no new hardware is added. The interconnections for the control signals in the bus, of course, will add a few more etching connections to the printed circuit board, but the cost of these are very little or negligible.

The herein described system and method provides the capability for a large microcode data base to be quickly and rapidly loaded into the microcode RAMs each time a digital system is initialized. By pre-loading microcode data into a flash memory connected to a maintenance controller and by using the existing high-speed, wide bus paths and emulating the normal controls utilized by the high speed processor logic, the described system and method allows the loading of microcode to be virtually invisible to the human operator. Thus, while in prior art technology the time to load microcode was measurable in minutes, the present system can load microcode in a few seconds which is almost unnoticeable to the human operator.

While a preferred embodiment of the disclosed system and method has been delineated as an example, other embodiments may also be developed which are encompassed by the following claims.

What is claimed is:

1. A system for fast loading, during initialization routines, of a microcode RAM in a central processing module having a central processor, a microcode RAM and data path array managed by a Programmable Control PAL means and interconnected by an internal processor bus, comprising:

(a) means to preload instruction code addresses and words from a maintenance subsystem into a flash memory connected to a programmable maintenance controller to continually maintain an updated instruction set of microcode words;

(b) means to transfer said instruction code addresses and words from said flash memory to said data path array via a high speed parallel transfer bus wherein said data path array also provides, for temporarily holding said microcode words being transferred, for communication between said internal processor bus and slower speed external dual system buses; and (c) means to control the transfer of said instruction code addresses and words from said data path array to said microcode RAM, said means to control the transfer including said programmable control PAL means which includes:

(c1) means to receive control instructions from said programmable maintenance controller and to transmit control signals to said central processor, to said microcode RAM and to said data path array, to enable said microcode instruction words to be transferred on said internal bus for loading into said microcode RAM.

2. In a network where a maintenance subsystem pre-loads a flash memory, in a central processing module, with microcode addresses and words before system initialization is initiated so that the flash memory always maintains an updated store of microcode instruction words for immediate availability and wherein said central processing module includes a maintenance controller means having a Control PAL means and a central processor with microcode RAM connected to a data path array module via an internal processor bus, a method for fast loading of said microcode RAM during initialization or re-initialization, comprising the steps of:

(a) pre-loading a flash memory attached to said maintenance controller with microcode addresses and words from a maintenance subsystem to maintain an updated instruction set of microcode words;

(b) transferring each said microcode address and word from said flash memory to said data path array module via a high speed parallel transfer bus wherein said data path array module also provides, for temporarily holding said microcode words being transferred, a communication path between said central processor and external modules residing on dual system buses;

(c) loading, under management of said Control PAL means, each said microcode word into said microcode RAM, from said data path array, at the correlating address for that microcode word; and (d) repeating steps (b) and (c) for each microcode address and word in said flash memory until all microcode words in said flash memory have been loaded into said microcode RAM.

3. A system for fast loading of microcode words in a microcode RAM of a central processing module comprising:

(a) a maintenance subsystem operating as a source of microcode addresses and microcode words for preloading said microcode addresses and words into a flash memory in said central processing module; and (b) said central processing module including:

(b1) a central processor interconnected via a processor bus to said microcode RAM and a Data Path Array Module; and (b2) control means for utilizing said microcode addresses from said flash memory to transfer said microcode words to said microcode RAM via said Data Path Array Module, said control means including:

(b2a) a programmable maintenance controller connected to said pre-loaded flash memory including:

(i) means to transfer addresses and microcode words from said flash memory, via a data and control bus, over to said Data Path Array Module; and (ii) means to initiate a Control PAL means to transfer said addresses and microcode words from said Data Path Array Module, to said microcode RAM via said processor bus;

(b3) high speed parallel transfer bus means connecting said maintenance controller and said Data Path Array Module;

(b4) said Control PAL means for initiating control signals to said central processor, to said Data Path Array Module, and to said microcode RAM; and (b5) said Data Path Array Module for temporarily holding said microcode words being transferred and including:

(i) means for enabling data transfers between said central processor and external modules on dual system buses.

4. The system of claim 1 wherein said Data Path Array Module includes:

(a) an address register for temporarily holding the address for each microcode word;

(b) a data register for temporarily holding the microcode word for each address in said address register.

5. The system of claim 1 wherein said Control PAL means includes:

(a) multiple flip-flop signal means for sequencing each address to said microcode RAM to load each microcode word at its proper address.

6. The system of claim 1 wherein said Control PAL means includes:

(a) means to signal said control means that all of the microcode words in said flash memory have been loaded into said microcode RAM.

* * * * *